United States Patent Office 3,283,998
Patented Nov. 8, 1966

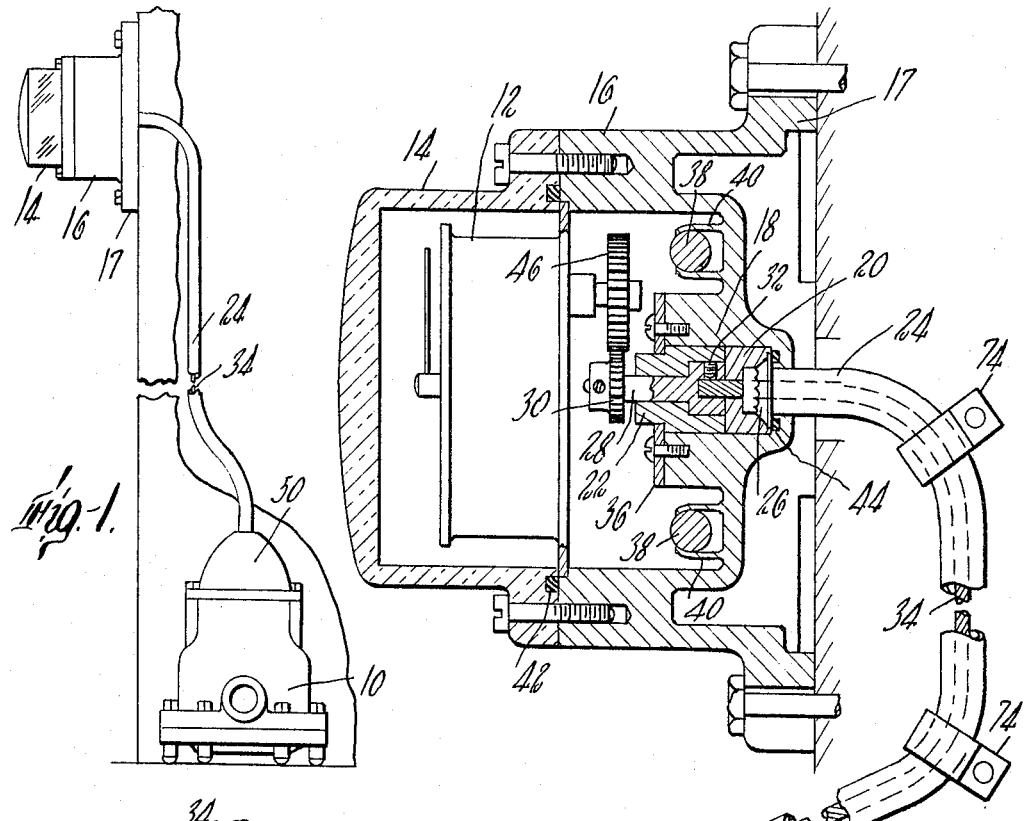
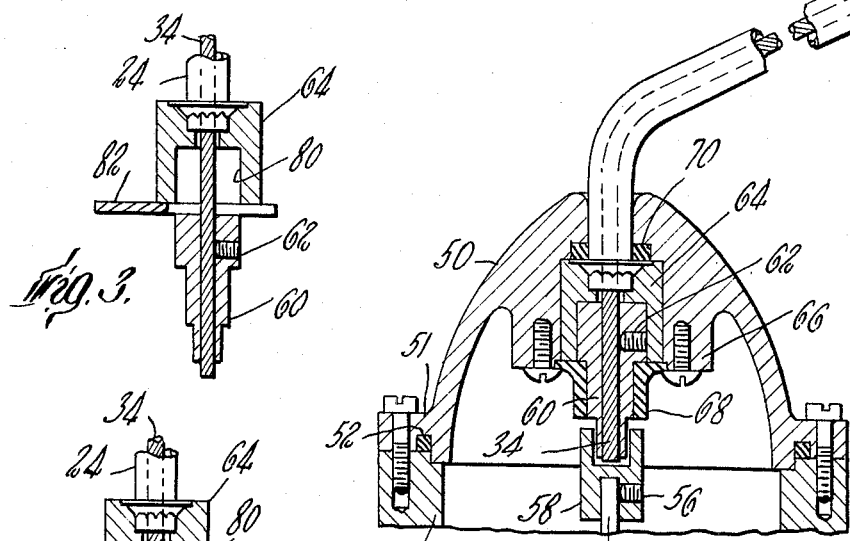
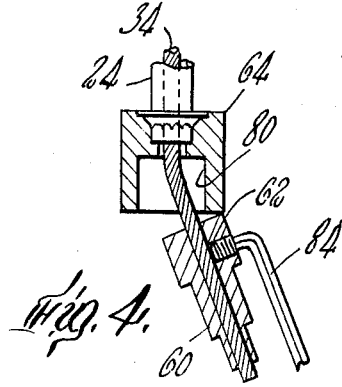

3,283,998
REGISTERING REMOTELY FROM METER
Roger W. Hood, North Attleboro, and Anthony M. Dell'
Orfano, Watertown, Mass., assignors to Hersey-Sparling
Meter Company, Dedham, Mass., a corporation of
Massachusetts
Continuation of application Ser. No. 353,172, Mar. 19,
1964. This application July 27, 1965, Ser. No. 475,139
2 Claims. (Cl. 235—91)

This application is a continuation of our application Serial No. 353,172, "Registering Remotely From Meter," filed March 19, 1964, now abandoned.

This invention relates to remote reading of registers responsive to meter actuation. More particularly, it provides new and improved means for reading meters, for example water meters, at a distance from said meters.

As has been heretofore recognized, it is very desirable that the meter reader for a utility such as a water company be able to read the meter without going into a house or its basement, where such a meter is typically installed. However, to be practical, apparatus to permit remote reading of this sort of widely used device must be reasonably inexpensive and yet at the same time be simple to install and accurate in operation. Furthermore, its power requirements must not be excessive. Provision of all these various and somewhat contradictory requisites has proved no easy or obvious chore for those skilled in the art.

Accordingly, objects of this invention are to provide a construction meeting all these requisites, to provide such a construction which despite simplicity of installation and accessibility and variable degrees of remoteness and installation configurations power requirements are nevertheless kept at such a low level that consistent accuracy of readings is obtained even with magnetic drive meters.

Generally speaking, the invention contemplates provision of a register housing adapted to be mounted as outside a house and a connection cap adapted to be mounted on the meter, the register housing and the connection cap carrying means for securing in each thereof a flexible drive shaft and a flexible enclosure therearound. The invention further contemplates such an enclosure having an inside diameter substantially greater than the outside diameter of said drive shaft, and a flexible drive shaft predeterminedly greater in length than said enclosure.

Other objects, advantages, and features of the invention will appear from the following description of a preferred embodiment thereof, taken in conjunction with the attached drawings, in which:

FIG. 1 is a diagrammatic view illustrating said embodiment in place, meter in the basement and register outside the house;

FIG. 2 is a vertical sectional view, partially broken away and with the drive shaft and its surrounding enclosure intermediately broken away;

FIG. 3 is a partial sectional view illustrating a preferred step in installation; and FIG. 4 is a corresponding partial sectional view illustrating a modified step in installation.

Referring now more particularly to the drawings, there is shown a water meter 10, which may suitably be the base portion of a prior art water meter, and a register 12, which may suitably be the register portion of the same water meter.

The register 12 is held in a housing defined by transparent methyl methacrylate housing cap 14 and unitary molded plastic housing body 16, in a small counterbore around the latter. The housing body includes a mounting portion 17 and support portion 18 axially counterbored to accept seal washer 20 and spindle bushing 22. Washer 20 is counterbored to accept enclosure or sheath 24 to a secure depth, and the counterbore is countersunk to accept casing fastener 26, which could be fairly easily moved onto the polyethylene tubing sheath 24, but by virtue of its teeth resists strongly movement in the other direction. Bushing 22 is drilled and counterbored to accept drive spindle 28, which carries change gear 30 for rotation therewith and is secured through set screw 32 to flexible drive 34 for rotation therewith. Bushing 22 is held axially in place in housing body 16 by retaining washer 36. Moisture detection capsules 38 are detachably held in the body 16 in grips 40 integrally molded therein, to signal any failure of O-ring gasket 42 to exclude moisture. Casing fastener 26 holds O-ring gasket 44 against body 16 to exclude moisture there. Train change gear 30 drivingly engages register change gear 46.

Mounted on meter 10 is unitary molded plastic connection cap 50, O-ring 52 providing therebetween a seal against moisture. Meter drive spindle 54 is secured by set screw 56 to female coupling 58, which is in driving relationship with male coupling and drive spindle 60 secured by set screw 62 on drive shaft 34. Bushing 64 carried in an axial counterbore in a support portion 66 of connection cap 50 is provided with a counterbore accepting coupling 60, which is held therein by coupling bushing 68. O-ring 70 is provided to seal against moisture.

The sheath 24 is secured to walls or other portions of the building at spaced locations by clamps 74. We have found that if thin-wall plastic tubing of relatively large size is used, its stiffness is enough to prevent unduly sharp bends which would interfere with drive shaft action, although required that in smaller sizes such greater wall thicknesses are needed (with consequent greater expense) to achieve the same degree of stiffness. Accordingly, the sheath may be installed with such bends as the configuration of the particular application indicate.

Even though the drive shaft is of outside diameter substantially less than the inside diameter of the sheath, so that the fit between them is sloppier than a loose bearing fit, and despite the bends, reliable low-torque action nevertheless results, we have found, if the drive shaft is of the optimum lay (that is, is of right hand lay when as with a Hersey meter the direction of rotation is counterclockwise, looking in the direction of the driven member from the driving member; and left hand lay if rotation is oppositely) and if the drive shaft is a small amount longer than the sheath, this amount being measured with the sheath fastened in position with all bends in and the drive shaft pulled taut, this amount being hereinafter referred to as "free length." For convenience in installation, the counterbore 80 of bushing 64 may be of depth corresponding to a useful free length over a typical range, e.g. 5 to 50 feet, this depth being 7/16 inch in a preferred embodiment, and (after cutting the sheath to the desired length, preferably measured to just above the upper surface of mounting portion 51 of connection cap 50, at which point a small gauge bump may be molded into the cap) the coupling 60 secured to the shaft 34 at a point providing this free length using a shim stock tool 82 (as shown in FIG. 3), or roughly without it (as shown in FIG. 4), by means of an Allen wrench 84.

We have found that, under the conditions already set forth, free length should be at least 1/8 inch. In our preferred embodiment, we use a drive shaft of 0.130 inch outside diameter and a polyethylene sheath 3/8 inch in outside diameter and 1/4 inch in inside diameter (for bends of not less than 4 inches in radius), and have discovered critical limits giving best results: free length should be 3/16 inch when the shaft length is under five feet, and should be (in inches) about $.203\sqrt[3]{L}$ (where L is shaft length in feet) for longer shaft length. A 3/16 inch setting can be conveniently provided by making the distance from the wrench 84 to the top of coupling 60 3/16 inch and letting the wrench cooperate with the bottom of bushing 64 to gauge this amount of free length.

Other embodiments within the appended claims will occur to those skilled in the art.

We claim:
1. Remote reading apparatus comprising
   a housing cap,
   a retaining washer,
   a housing body,
   said housing body including a mounting portion and a support portion,
      said support portion and said mounting portion being generally symmetrical about a common axis, said mounting portion being further from said axis than said support portion and extending further in a direction of said axis away from said housing cap,
      said housing body cooperating with said housing cap at a portion opposed to said mounting portion and extending further in a direction of said axis toward said housing cap than said support portion, and
      said support portion including an axial counterbore and said retaining washer support surface therearound,
   a spindle bushing held in said counterbore by a retaining washer,
   a spindle mounted for rotation in said spindle bushing and about said axis,
   a seal washer mounted in said counterbore between said housing body and said spindle bushing,
      said seal washer including successively in an axial direction away from said spindle bushing, a hole, a counterbore, and a countersink,
   a sheath with one end thereof seated in the seal washer counterbore,
   a flexible drive shaft extending through and beyond said sheath and said seal washer and secured in said spindle,
   a fastener seated in said countersink and including teeth engaging said sheath, said teeth being inclined to facilitate introduction of said sheath into said seal washer counterbore and discourage removal thereof therefrom,
   a connection cap remote from said housing body,
      said connection cap including a mounting portion for cooperation with a water meter and a support portion,
         the connection cap support portion and connection cap mounting portion being generally symmetrical about a common axis, said connection cap mounting portion being further from said axis than said connection cap support portion and the latter being spaced from said water meter,
         the connection cap support portion including a counterbore axial thereof and a coupling bushing reception surface therearound,
   a bushing seated in the connection cap counterbore, said bushing including a coupling counterbore toward said water meter, a countersink away therefrom, and a hole and sheath counterbore therebetween, said hole accepting said flexible drive shaft therethrough, and said sheath counterbore accepting the other end of said sheath,
   a second fastener seated in the last-mentioned countersink and including teeth engaging said sheath, said teeth being inclined to facilitate introduction of said sheath into the bushing counterbore and discourage removal thereof therefrom,
   a coupling secured on said flexible drive shaft and rotatably seated in said bushing counterbore, and
   a coupling bushing securing said coupling against said reception surface,
   each of said housing cap, housing body, connection cap, and sheath being formed of plastic,
   whereby is provided a simple and practical remote reading register capability.

2. The apparatus of claim 1 in which said sheath is of inside diameter substantially greater than the outside diameter of said drive shaft, and said drive shaft has a free length of at least 1/8 inch.

References Cited by the Examiner

UNITED STATES PATENTS

| | | | |
|---|---|---|---|
| 2,094,711 | 10/1937 | Leininger | 73—272 |
| 2,354,563 | 7/1944 | Weisse | 73—272 |
| 2,630,714 | 3/1953 | Zimmerman | 73—272 |
| 2,684,810 | 7/1954 | Bryant | 73—272 X |
| 2,733,616 | 2/1956 | Zimmerman | 73—272 X |
| 2,738,672 | 3/1956 | Smith | 73—272 |
| 3,005,344 | 10/1961 | Nelson | 73—272 |
| 3,043,120 | 7/1962 | Waldron | 64—2 |
| 3,052,083 | 9/1962 | Piquerez | 58—90 |
| 3,059,849 | 10/1962 | Saltzman | 235—94 X |

FOREIGN PATENTS 861,519    7/1949    Germany.

RICHARD B. WILKINSON, *Primary Examiner.*

LOUIS J. CAPOZI, *Examiner.*

T. J. ANDERSON, *Assistant Examiner.*